United States Patent
Zhang et al.

(10) Patent No.: US 11,590,991 B2
(45) Date of Patent: Feb. 28, 2023

(54) BOGIE AND RAIL VEHICLE

(71) Applicant: CRRC TANGSHAN CO., LTD., Hebei (CN)

(72) Inventors: Lixin Zhang, Tangshan (CN);
Hongjiang Xu, Tangshan (CN);
Hongwei Jing, Tangshan (CN);
Yunlong Zhang, Tangshan (CN);
Chuan Ma, Tangshan (CN);
Guangsheng Zheng, Tangshan (CN);
Chao Li, Tangshan (CN)

(73) Assignee: CRRC TANGSHAN CO., LTD., Hebei (CN)

( * ) Notice: Subject to any disclaimer, the term of this patent is extended or adjusted under 35 U.S.C. 154(b) by 141 days.

(21) Appl. No.: 17/053,470

(22) PCT Filed: Aug. 20, 2018

(86) PCT No.: PCT/CN2018/101365
§ 371 (c)(1),
(2) Date: Nov. 6, 2020

(87) PCT Pub. No.: WO2020/006821
PCT Pub. Date: Jan. 9, 2020

(65) Prior Publication Data
US 2021/0237782 A1    Aug. 5, 2021

(30) Foreign Application Priority Data
Jul. 5, 2018  (CN) .......................... 201810730252.8

(51) Int. Cl.
*B61H 1/00* (2006.01)
*B61F 5/50* (2006.01)

(52) U.S. Cl.
CPC ............... *B61H 1/003* (2013.01); *B61F 5/50* (2013.01)

(58) Field of Classification Search
CPC .......... B61H 1/003; B61H 5/00; B61H 13/34; B61F 5/50; B61F 7/00; F16D 55/2245; F16D 2055/0008
(Continued)

(56) References Cited

U.S. PATENT DOCUMENTS 2,830,679 A * 4/1958 Butler ................. F16D 55/2245
188/71.7
3,122,218 A * 2/1964 Parton ...................... B61H 5/00
188/59
(Continued)

FOREIGN PATENT DOCUMENTS

CN    200992209 Y    12/2007
CN    105365842 A     3/2016
(Continued)

OTHER PUBLICATIONS

English machined translation of CN—107628059 A, Jan. 26, 2018.*
(Continued)

*Primary Examiner* — Robert A. Siconolfi
*Assistant Examiner* — San M Aung
(74) *Attorney, Agent, or Firm* — Syncoda LLC; Feng Ma

(57) ABSTRACT

A bogie and a rail vehicle, wherein the bogie includes: a framework, a wheel pair connected to the framework, a braking hanger fixed to the framework, a hanger slider used for fixedly connecting to a vehicle wheel braking clamp, and a transmission member; the hanger slider is connected to the braking hanger, and the transmission member is connected to the hanger slider; a first end of the transmission member extends to a side surface of a vehicle wheel in the wheel pair, and the transmission member is used to drive the hanger slider to move along the lateral direction with respect to the braking hanger when the first end is subjected to a thrust applied in the lateral direction by the vehicle wheel, so that (Continued)

the vehicle wheel braking clamp moves to a position corresponding to the vehicle wheel.

13 Claims, 22 Drawing Sheets

(58) Field of Classification Search
USPC .................................................. 188/153 R
See application file for complete search history.

(56) References Cited

U.S. PATENT DOCUMENTS

| | | | |
|---|---|---|---|
| 3,974,780 A | 8/1976 | Estrada | |
| 5,471,933 A | 12/1995 | Yoshino | |
| 8,590,459 B2 | 11/2013 | Forclaz | |
| 2010/0319564 A1 | 12/2010 | Forclaz | |

FOREIGN PATENT DOCUMENTS

| | | | | |
|---|---|---|---|---|
| CN | 106915361 A | 7/2017 | | |
| CN | 107521519 A | 12/2017 | | |
| CN | 206691128 U | 12/2017 | | |
| CN | 107628059 A | 1/2018 | | |
| CN | 107757652 A | 3/2018 | | |
| EP | 46619 A | * 3/1982 | ............. | B61H 15/00 |
| EP | 0899177 A1 | 3/1999 | | |
| JP | H06206541 A | 7/1994 | | |
| WO | 2009101023 A1 | 8/2009 | | |
| WO | WO-2011006795 A1 | * 1/2011 | ................ | B61F 5/32 |

OTHER PUBLICATIONS

Supplementary European Search Report in the European application No. 18925500.3, dated May 18, 2021.

International Search Report in the international application No. PCT/CN2018/101365, dated Mar. 27, 2019.

English translation of the Written Opinion of the International Search Authority in the international application No. PCT/CN2018/101365, dated Mar. 27, 2019.

First Office Action of the Chinese application No. 201810730252.8, dated May 12, 2020.

* cited by examiner

BOGIE AND RAIL VEHICLE

CROSS-REFERENCE TO RELATED APPLICATIONS

The present application is a national stage of International Application No. PCT/CN2018/101365 filed on Aug. 20, 2018, which claims priority to Chinese Patent Application No. 201810730252.8 filed on Jul. 5, 2018. The disclosures of these applications are hereby incorporated by reference in their entireties.

TECHNICAL FIELD

The present disclosure relates to the technology of a bogie of a rail vehicle, and more particularly to a bogie and a rail vehicle.

BACKGROUND

Generally, rail trains include monorail trains and dual-rail trains, in which the dual-rail trains travel along two parallel tracks. The gauge refers to the distance between two tracks. Most countries or regions adopt a uniform gauge, but some countries or regions adopt different gauges. Before the rail train travels from a track with one gauge to a track with another gauge, it needs to perform a track changing operation. That is, the distance between two vehicle wheels connected to the same axle in a rail train is adjusted, so that the distance between the vehicle wheels can be adapted to a new gauge.

The axle and the two vehicle wheels connected thereto are collectively referred as a wheel pair. The wheel pair is arranged on the bogie of the rail train, and the two vehicle wheels may move relative to each other along the axial direction of the axle. The bogie is provided with a vehicle wheel braking clamp. When the rail train is in a braking state, the vehicle wheel braking clamp is in close contact with the disk surface or the tread of the vehicle wheels, to increase the friction between the vehicle wheels and reduce the traveling speed of the rail vehicle.

In the current related track changing operations, after the distance between the vehicle wheels of the rail train is adjusted, it is also necessary to manually adjust the position of the vehicle wheel braking clamp to make it correspond to the adjusted vehicle wheels. Generally, the vehicle wheel braking clamp is fixed on the bogie through a pin. During the adjustment process, the operator needs to manually disassemble the pin and adjust the position of the braking clamp to the target position, and then install the pin to lock the braking clamp on the bogie. This operation process is relatively cumbersome, resulting in low efficiency of the track changing operations.

SUMMARY

In view of this, the embodiments of the present disclosure provide a bogie and a rail vehicle, which may simplify track changing operations, thereby improving efficiency.

In order to achieve the above objects, the technical solutions of the embodiments of the present disclosure are implemented as follows.

According to the first aspect of the embodiments of the present disclosure, a bogie is provided. The bogie includes: a framework, a wheel pair connected to the framework, a braking hanger fixed to the framework, a hanger slider configured to be fixedly connected to a vehicle wheel braking clamp, and a transmission member.

The hanger slider is connected to the braking hanger, and the transmission member is connected to the hanger slider. A first end of the transmission member extends to a side surface of a vehicle wheel in the wheel pair, and the transmission member is configured to drive the hanger slider to move along a transverse direction with respect to the braking hanger when the first end is subjected to a thrust applied in the transverse direction by the vehicle wheel, so that the vehicle wheel braking clamp moves to a position corresponding to the vehicle wheel.

For the bogie as described above, the hanger slider includes a substrate plate connected to the vehicle wheel braking clamp, and a first guiding structure arranged on the substrate plate.

The braking hanger includes a base connected to the framework, and a second guiding structure arranged on the base.

The first guiding structure is connected to the second guiding structure, and movable along the transverse direction with respect to the second guiding structure.

For the bogie as described above, the first guiding structure is a guiding block, and the second guiding structure is a guiding frame for receiving the guiding block.

For the bogie as described above, a receiving space is provided between the guiding block and the substrate plate.

The guiding frame includes a top plate, a bottom plate inserted into the receiving space, and a side plate connected between the top plate and the bottom plate.

For the bogie as described above, an inner surface of the top plate of the guiding frame facing the bottom plate is provided with an elastic guiding mechanism.

A top surface of the guiding block is recessed inwardly to form a wave-shaped guiding groove with more than two wave troughs, and the elastic guiding mechanism is configured to abut against a surface of the wave-shaped guiding groove.

For the bogie as described above, the elastic guiding mechanism includes a first spring, a guiding wheel and a first rotating shaft.

One end of the first spring is fixed to the inner surface of the top plate, and another end of the first spring is connected to the first rotating shaft, and the first rotating shaft is inserted into an axial hole of the guiding wheel.

For the bogie as described above, the elastic guiding mechanism includes a first spring, a guiding wheel, a first rotating shaft and a supporting block.

A top surface of the supporting block is recessed inwardly to form a supporting slot for receiving the first spring. One end of the first spring is fixed to the inner surface of the top plate. The supporting block is provided with a supporting lug extending towards the guiding wheel, and the supporting lug is provided with a supporting hole through which an end of the first rotating shaft passes. The first rotating shaft is inserted into an axial hole of the guiding wheel.

For the bogie as described above, more than two rollers arranged along the transverse direction are provided between the bottom plate and the guiding block.

For the bogie as described above, the transmission member includes a linkage, a first end of which serves as the first end of the transmission member, and a second end of which serves as a second end of the transmission member.

For the bogie as described above, the substrate plate is provided with a hinge part, with which a middle part of the linkage is hinged.

For the bogie as described above, the hinge part includes an upper hinge plate, a lower hinge plate and a stopping plate connected between the upper hinge plate and the lower hinge plate. Each of the upper hinge plate and the lower hinge plate is provided with a hinge hole, which is configured to be connected with a through hole provided in the middle part of the linkage through a hinge member.

For the bogie as described above, the bogie further includes a locking mechanism, which is configured for locking the guiding block in a preset position.

For the bogie as described above, the locking mechanism includes a first locking member, a second locking member, a locking block and a second spring. The first locking member is provided with a first guiding ramp, and the locking block is provided with a second guiding ramp cooperating with the first guiding ramp.

A sidewall of the guiding block parallel to the transverse direction is provided with more than two locking slots sequentially arranged along the transverse direction.

One end of the second spring is connected to the base, and another end of the second spring is connected to the locking block, to push the locking block to be inserted into the locking slot to lock the guiding block.

The first locking member is connected to the second end of the linkage, to cooperate with the second locking member under the driving of the linkage to push the locking block out of the locking slot to unlock the guiding block.

For the bogie as described above, the transmission member further includes a transverse displacing wheel, which is connected to the first end of the linkage, and a tread of which is configured for contacting with a rim of the vehicle wheel.

For the bogie as described above, the substrate plate is provided with an adjusting mechanism arranged between the substrate plate and the transmission member, which is configured for adjusting transverse displacement of the transmission member to maintain a preset distance between the first end of the transmission member and the vehicle wheel.

For the bogie as described above, the adjusting mechanism includes an adjusting spring and an adjusting block.

The substrate plate is provided with an adjusting hole, a center line of which is parallel to the transverse direction, and within which the adjusting spring is received. One end of the adjusting spring is fixedly connected to the adjusting block, and the adjusting block abuts against a side of the transmission member facing the guiding block.

According to the second aspect of the embodiments of the present disclosure, a rail vehicle is provided, which includes the bogie as described above.

In the technical solution provided by the present disclosure, by fixing the braking hanger on the framework of the bogie and fixedly connecting the hanger slider and the vehicle wheel braking clamp, the hander slider is connected to the braking hanger and is movable along the transverse direction with respect to the braking hanger. Furthermore, the transmission member is connected to the hanger slider, and the first end of the transmission member extends to the side surface of the vehicle wheel. When the vehicle wheel moves along the transverse direction, the transmission member drives the hanger slider and the vehicle wheel braking clamp to move along the transverse direction by a thrust applied by the vehicle wheel, so that the vehicle wheel braking clamp moves automatically to a position corresponding to the vehicle wheel with the movement of the vehicle wheel. This ensures that the rail train is braked by cooperating with the vehicle wheel in the braking state, without the need to manually adjust the position of the vehicle wheel braking clamp. This not only reduces the work intensity of the operators, but also improves the efficiency of the gauge changing process of the rail train.

BRIEF DESCRIPTION OF THE DRAWINGS

The accompanying drawings described here are used for providing further understanding of the present disclosure and constitute a part of the present disclosure. Schematic embodiments of the present disclosure and description thereof are used for illustrating the present disclosure and not intended to form an improper limit of the present disclosure. In the accompanying drawings.

REFERENCE NUMERALS

1—framework;
2—wheel pair; 21—vehicle wheel;
3—braking hanger; 31—base; 311—receiving slot; 32—guiding frame; 321—top plate;
322—bottom plate; 3221—through hole; 323—side plate; 33—housing slot; 34—bump;
4—hanger slider; 41—substrate plate; 411—clamp mounting hole; 42—guiding block;
421—wave-shaped guiding groove; 422—locking slot; 4221—first locking slot; 4222—second locking slot; 43—receiving space; 44—fixing plate; 45—guiding rod; 46—roller; 471—upper hinge plate; 472—lower hinge plate; 473—stopping plate; 474—hinge hole; 48—adjusting hole;
5—vehicle wheel braking clamp;
6—transmission member; 61—linkage; 62—transverse displacing wheel; 63—connecting lug;
71—first spring; 72—guiding wheel; 74—supporting block; 741—supporting slot; 75—supporting lug; 76—supporting hole;
81—adjusting spring; 82—adjusting block; 83—claw;
91—first locking member; 911—first guiding ramp; 92—second locking member;
93—locking block; 931—second guiding ramp; 94—second spring.

DETAILED DESCRIPTION

In order to make the technical solutions and advantages in embodiments of the present disclosure clearer, the exemplary embodiments in the present disclosure are further elaborated below in combination with the accompanying drawings. It is apparent that the described embodiments are only a part of the embodiments of the present disclosure but not all. It is to be noted that the embodiments in the present disclosure and the characteristics in the embodiments may be combined under the condition of no conflicts.

Figure 1:
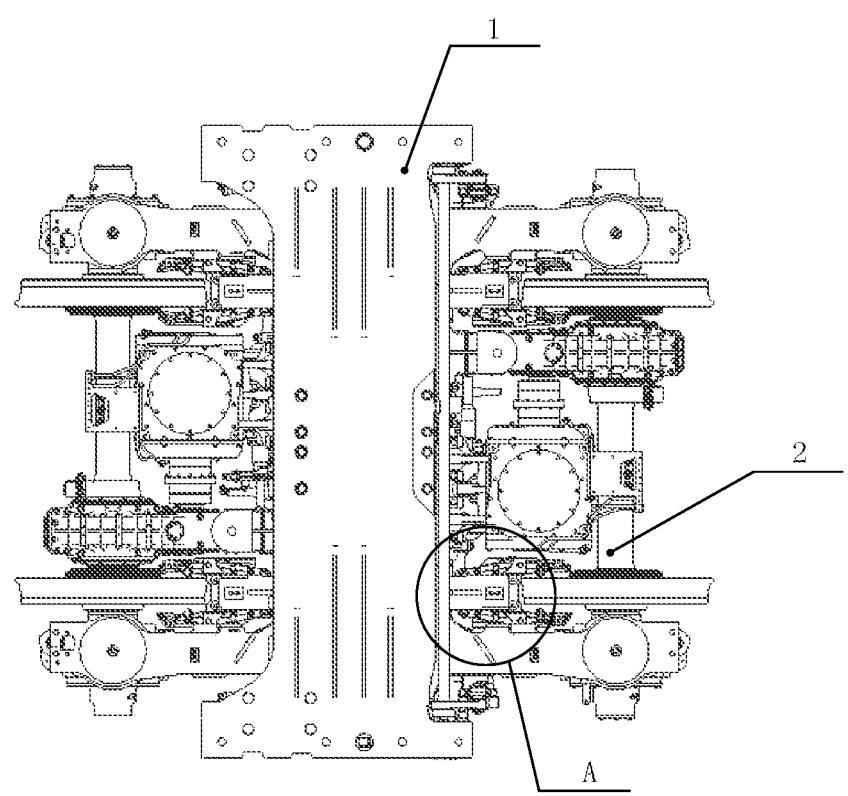
FIG. 1 illustrates a schematic diagram of a bogie provided in embodiments of the present disclosure.

FIG. 1 illustrates a schematic diagram of a bogie provided in embodiments of the present disclosure. As shown in FIG. 1, the present disclosure provides a bogie, which may be applied to rail trains, such as electric locomotives, diesel locomotives, urban rail vehicle, etc. The bogie includes a framework 1 and a wheel pair 2. The structure of the framework 1 can refer to the related art. The wheel pair 2 is connected to the framework 1. The wheel pair 2 includes an axle and two vehicle wheels 21 symmetrically arranged on the axle, of which the structure may also refer to the related art. In addition, the bogie further includes an axle box, a primary spring, a secondary spring, a motor hanger and other structures, all of which may be implemented by commonly-used means in the related art, and duplicate discussion of which would be omitted in this embodiment and which are not marked in the figures. If the bogie is provided with a motor hanger, the bogie may serve as a power bogie; if the bogie is not provided with a motor hanger, the bogie may serve as a non-power bogie.

Figure 2:
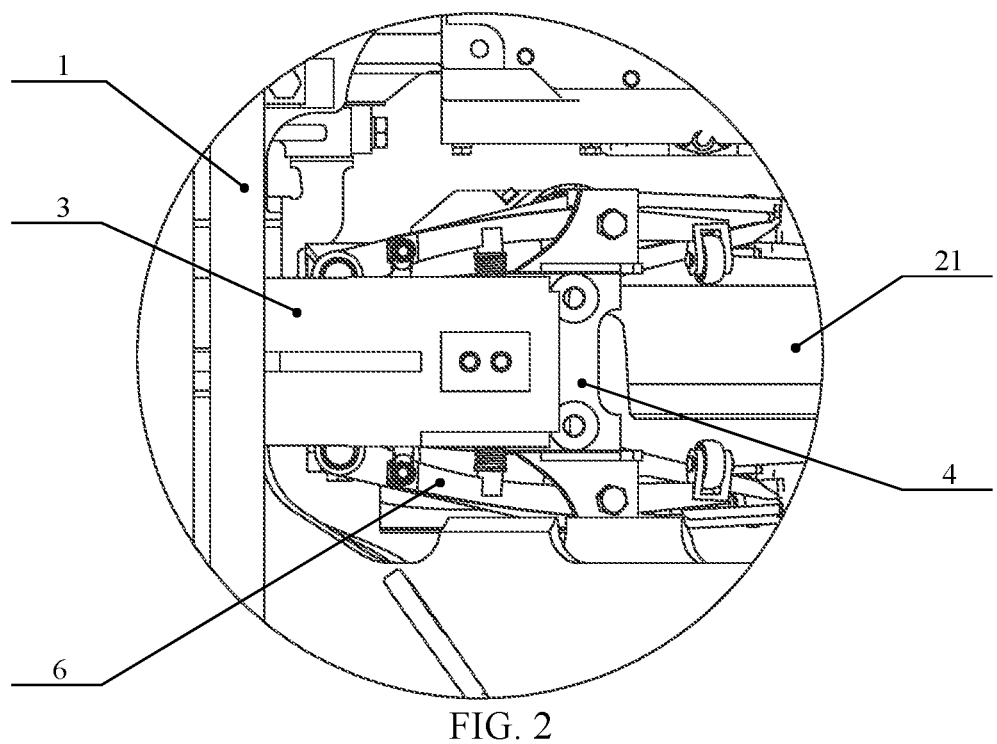
FIG. 2 illustrates an enlarged view of area A in FIG. 1.
Figure 3:
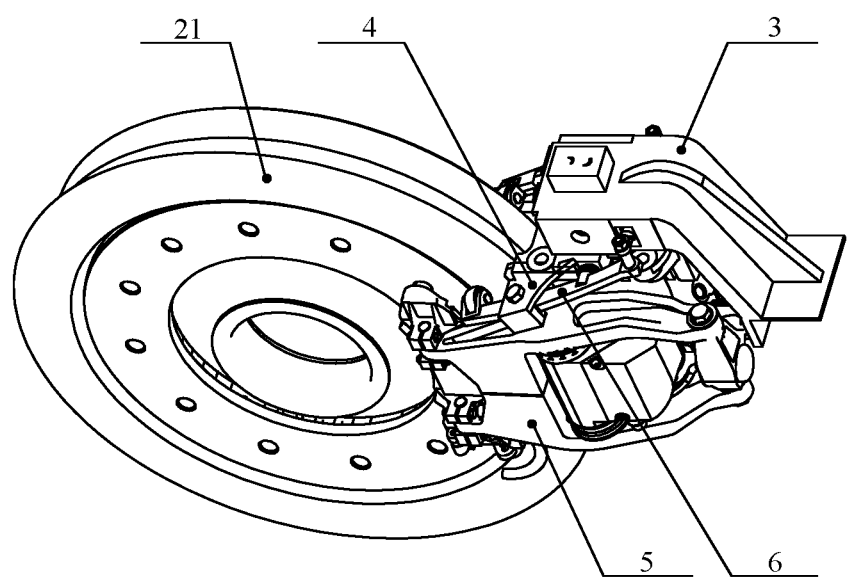
FIG. 3 illustrates a perspective view of a braking device in a bogie provided in embodiments of the present disclosure.
Figure 4:
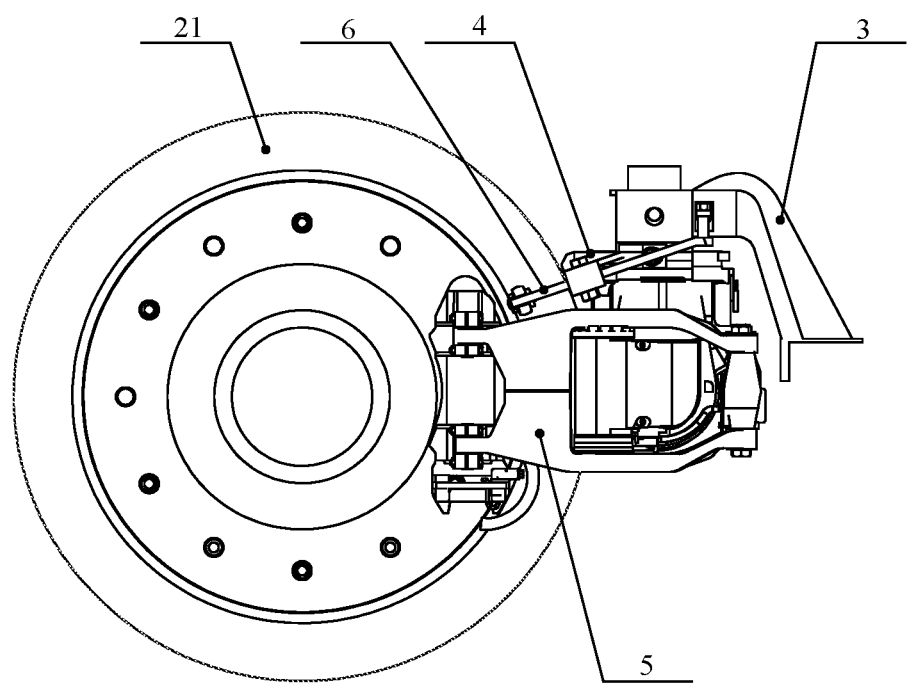
FIG. 4 illustrates a front view of a braking device in a bogie provided in embodiments of the present disclosure.
Figure 5:
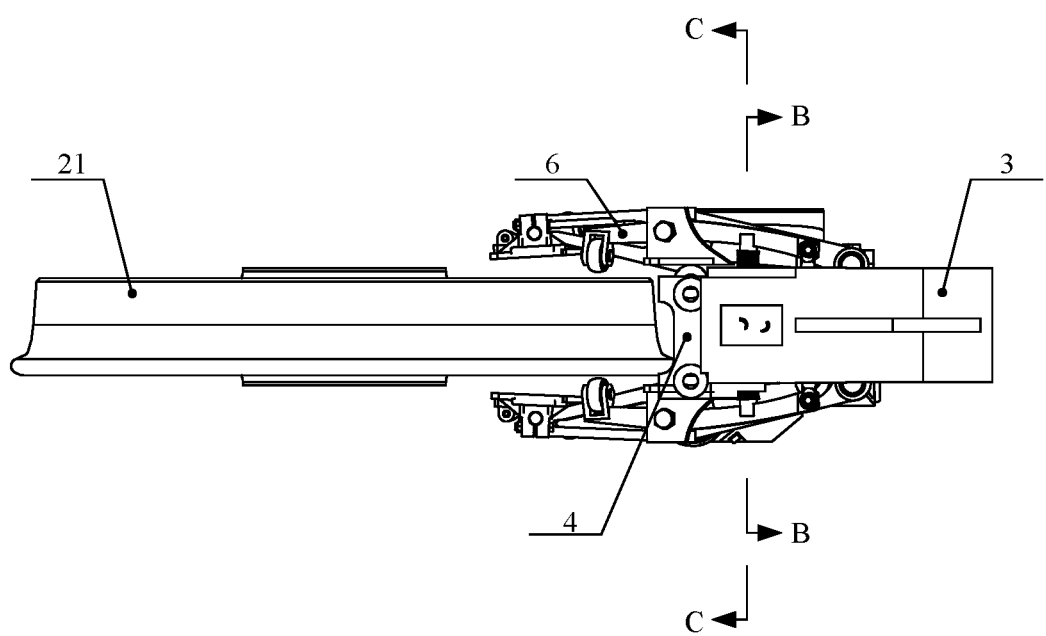
FIG. 5 illustrates a top view of a braking device in a bogie provided in embodiments of the present disclosure.
Figure 6:
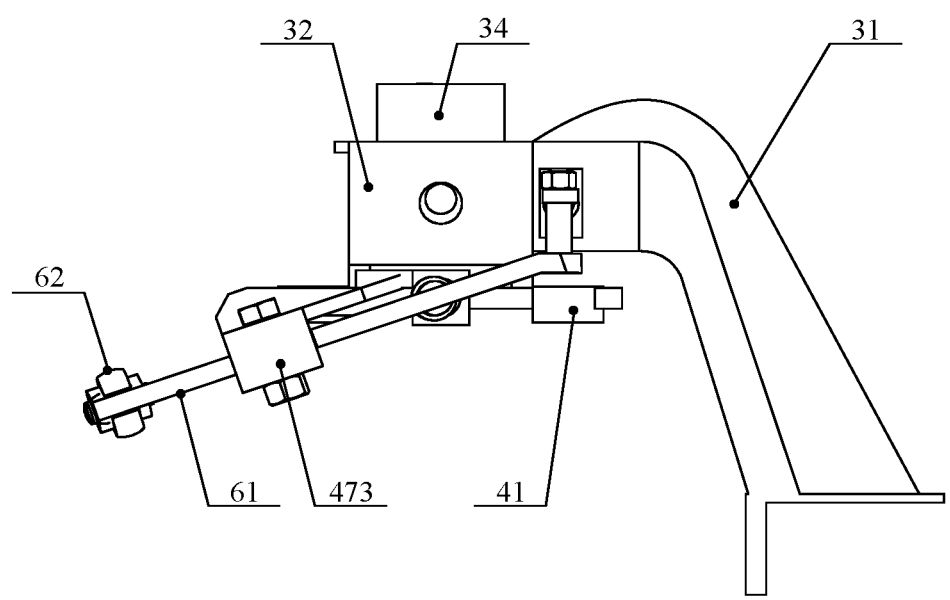
FIG. 6 illustrates a front view of a braking device in a bogie provided in embodiments of the present disclosure, in which a vehicle wheel braking clamp is removed.

FIG. 2 illustrates an enlarged view of area A in FIG. 1. FIG. 3 illustrates a perspective view of a braking device in a bogie provided in embodiments of the present disclosure. FIG. 4 illustrates a front view of a braking device in a bogie provided in embodiments of the present disclosure. FIG. 5 illustrates a top view of a braking device in a bogie provided in embodiments of the present disclosure. FIG. 6 illustrates a front view of a braking device in a bogie provided in embodiments of the present disclosure, in which a vehicle wheel braking clamp is removed. As shown in FIG. 1 to FIG. 6, the bogie provided in the present disclosure further includes a braking device, which is arranged on the framework 1 and configured to be in press contact with the vehicle wheel 21 when the rail vehicle is in a braking state, to reduce the traveling speed of the rail train.

The braking device specifically includes a braking hanger 3, a hanger slider 4, a vehicle wheel braking clamp 5 and a transmission member 6. The vehicle wheel braking clamp 5 may adopt a structure commonly-used in the related art, and specifically may be a structure that is in contact with the tread of the vehicle wheel 21 for braking, or a structure that clamps the rim of the vehicle wheel 21 from both sides of the vehicle wheel for braking, which is not specifically limited in this embodiment. The vehicle wheel braking clamp 5 with the above two structures may be applied to the bogie provided in the present disclosure.

In this embodiment, only taking the vehicle wheel braking clamp 5 which clamps the rim of the vehicle wheel 21 from both sides of the vehicle wheel for braking as an example, the implementation of the bogie would be described in detail. Those skilled in the art may also refer to the implementation provided in this embodiment, to replace the vehicle wheel braking clamp 5 with a structure that is in contact with the tread of the vehicle wheel 21 for braking.

In order to fixedly connect the vehicle wheel braking clamp 5 to the hanger slider 4, welding, screwing, clamping and the like may be adopted. In this embodiment, the hanger slider 4 is provided with bolt holes, and the vehicle wheel braking clamp 5 is fixed thereto by bolts.

In order to fix the braking hanger 3 on the framework 1, welding, screwing, clamping and the like may be adopted.

In the bogie provided in this embodiment, the vehicle wheel 21 may move along a transverse direction, which is an axial direction of the axle. The movement mode of the vehicle wheel 21 along the transverse direction and the structure cooperating with the vehicle wheel may be implemented with reference to the structure of the bogie capable of changing the gauge in the related art, which is not described in detail in this embodiment.

After the vehicle wheel 21 moves along the transverse direction, the vehicle wheel braking clamp 5 has to move in the same direction and the same distance as the vehicle wheel 21, to ensure the vehicle wheel braking clamp 5 may cooperate with the vehicle wheel 21 to achieve braking effect. In the related art, by manually adjusting the position of the vehicle wheel braking clamp 5, the operation is relatively cumbersome and the efficiency is low. In the bogie provided in this embodiment, the vehicle wheel braking clamp 5 may automatically follow the movement of the vehicle wheel 21 to move to the target position, so that one brake shoe of two brake shoes of the vehicle wheel braking clamp 5 is located at one side of the vehicle wheel 21 and another brake shoe of the two brake shoes of the vehicle wheel braking clamp 5 is located at another side of the vehicle wheel 21, and the distance from one brake shoe of the two brake shoes to the vehicle wheel 21 and the distance from another brake shoe of the two brake shoes to the vehicle wheel 21 is substantially equal.

The above-mentioned hanger slider 4 is connected to the braking hanger 3 and movable with respect to the braking hanger 3 along the transverse direction. The transmission member 6 is connected to the hanger slider 4, and the first end of the transmission member 6 extends to the side surface (i.e. the rim surface) of the vehicle wheel 21.

When the vehicle wheel 21 moves along the transverse direction, it may generate a thrust on the first end of the transmission member 6. The transmission member 6 may drive the hanger slider 4 to move along the transverse direction when the transmission member 6 is subjected to a thrust applied by the vehicle wheel 21, so that the hanger slider 4 moves with respect to the braking hanger 3. The vehicle wheel braking clamp 5 is fixedly connected to the hanger slider 4, so that the vehicle wheel braking clamp 5 may move along with the braking hanger 3 to a position corresponding to the vehicle wheel 21.

The number of the above-mentioned transmission member 6 may be two, and the first end of one transmission member of two transmission members is located at one side of the vehicle wheel 21, and the first end of another transmission member of the two transmission members is located at another side of the vehicle wheel 21. Therefore, regardless of whether the vehicle wheel 21 moves along the transverse direction towards the inside or outside of the bogie, the transmission member 6 may drive the hanger slider 4 and the vehicle wheel braking clamp 5 to move, so that the braking device may satisfy a movement of the vehicle wheel 21 in two directions.

In the process of changing the gauge of the bogie, two wheels 21 in the same wheel pair 2 move towards or away from one another. Each vehicle wheel 21 is provided with a vehicle wheel braking clamp 5, so that in a position corresponding to each vehicle wheel 21, a braking hanger 3, a hanger slider 4 and a transmission member 6 provided in this embodiment are all provided, which may automatically follow the movement of the corresponding vehicle wheel 21 to move.

In the technical solution provided in this embodiment, by fixing the braking hanger on the framework of the bogie and fixedly connecting the hanger slider and the vehicle wheel braking clamp, the hander slider is connected to the braking hanger and is movable along the transverse direction with respect to the braking hanger. Furthermore, the transmission member is connected to the hanger slider, and the first end of the transmission member extends to the side surface of the vehicle wheel. When the vehicle wheel moves along the transverse direction, the transmission member drives the hanger slider and the vehicle wheel braking clamp to move along the transverse direction by a thrust applied by the vehicle wheel, so that the vehicle wheel braking clamp moves automatically to a position corresponding to the vehicle wheel with the vehicle wheel. This ensures that the rail train is braked by cooperating with the vehicle wheel in the braking state, without the need to manually adjust the position of the vehicle wheel braking clamp. This not only reduces the work intensity of the operators, but also improves the efficiency of the gauge changing process of the rail train.

There may be many ways to connect the slider 4 to the braking hanger 3 and move the hanger slider 4 along the transverse direction with respect to the braking hanger 3 as described above. For example, the hanger slider 4 is provided with a first guiding member, and correspondingly, the braking hanger 3 is provided with a second guiding member. With the cooperation between the first guiding member and the second guiding member, it is not only possible to achieve that the hanger slider 4 is connected to the braking hanger 3, but also to achieve that the hanger slider 4 is movable with respect to the braking hanger 3.

The above-mentioned first guiding member may be a slider, and the second guiding member may be a sliding groove, or the first guiding member may be a sliding groove, and the second guiding member may be a slider. The slider may be received in the sliding groove and move in the sliding groove.

Alternatively, the first guiding member is a slider, and the second guiding member is a sliding rail, or the first guiding member is a sliding rail, and the second guiding member is a slider. The slider is disposed on the sliding rail and movable along the sliding rail.

Alternatively, the first guiding member and the second guiding member may also be in other forms, which is not limited in this embodiment.

This embodiment provides a manner for connecting the hanger slider 4 and the braking hanger 3 and moving the hanger slider 4 in cooperation with the braking hanger 3.

Figure 7:
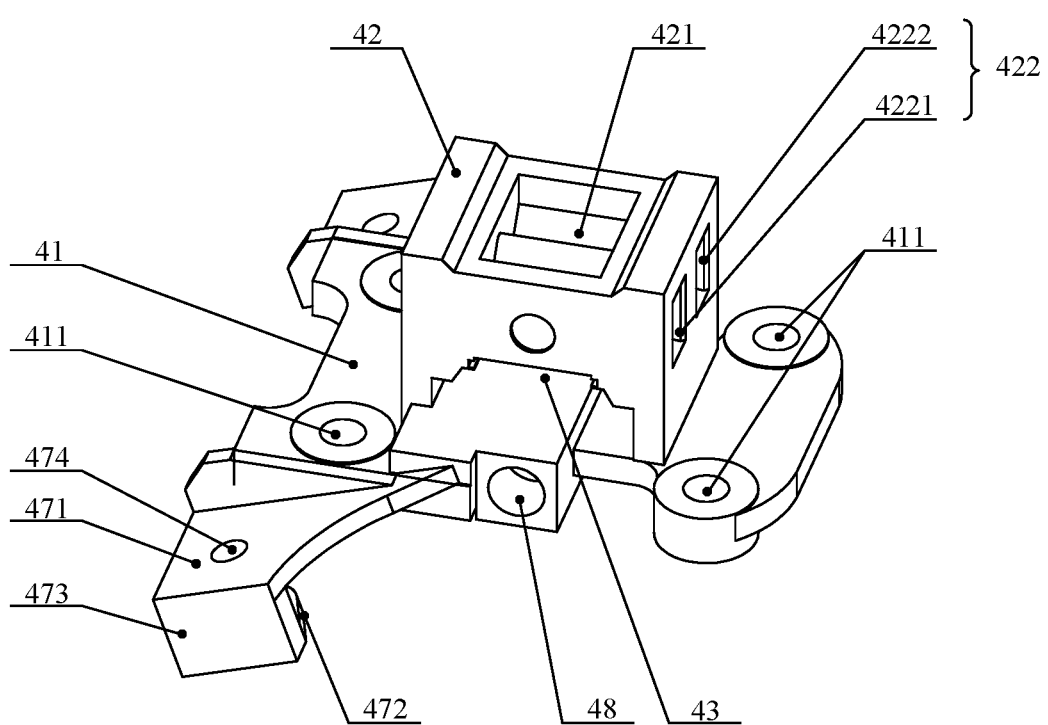
FIG. 7 illustrates a perspective view of a hanger slider in a bogie provided in embodiments of the present disclosure.

FIG. 7 illustrates a perspective view of a hanger slider in a bogie provided in embodiments of the present disclosure. As shown in FIGS. 3, 4, 6 and 7, the above-mentioned hanger slider 4 includes a substrate plate 41 and a first guiding structure arranged on the substrate plate 41. The first guiding structure is fixed on the substrate plate 41. For example, the first guiding structure is integral with the substrate plate 41, or the first guiding structure is fixed on the substrate plate 41 by welding, clamping, screwing, riveting or the like.

The substrate plate 41 is connected to the vehicle wheel braking clamp 5. Specifically, the substrate plate 41 may be provided with clamp mounting holes 411, and the number and position of the clamp mounting holes 411 may correspond to that of mounting holes on the vehicle wheel braking clamp 5, so that the bolts pass through the corresponding clamp mounting holes 411 and the mounting holes on the vehicle wheel braking clamp 5 to fixedly connect the substrate plate to the vehicle wheel braking clamp.

The braking hanger 3 includes a base 31 and a second guiding structure arranged on the base 31. The second guiding structure is fixed on the base 31. For example, the second guiding structure is integral with the base 31, or the second guiding structure is fixed on the base 31 by welding, clamping, screwing, riveting or the like. The base 31 is connected to the framework 1 by welding, clamping, screwing, riveting or the like.

The above-mentioned first guiding structure is connected to the second guiding structure, and the first guiding structure is movable along the transverse direction with respect to the second guiding structure. In this embodiment, the first guiding structure is specifically a guiding block 42, and the guiding block 42 is integral with the substrate plate 41. The second guiding structure is specifically a guiding frame 32, and the guiding frame 32 is integral with the base 31. The above-mentioned guiding block 42 may be received in the guiding frame 32, and may move along the transverse direction with respect to the guiding frame 32.

On the basis of the above technical solutions, this embodiment provides a specific structure of the braking hanger 3 and the hanger slider 4.

Figure 8:
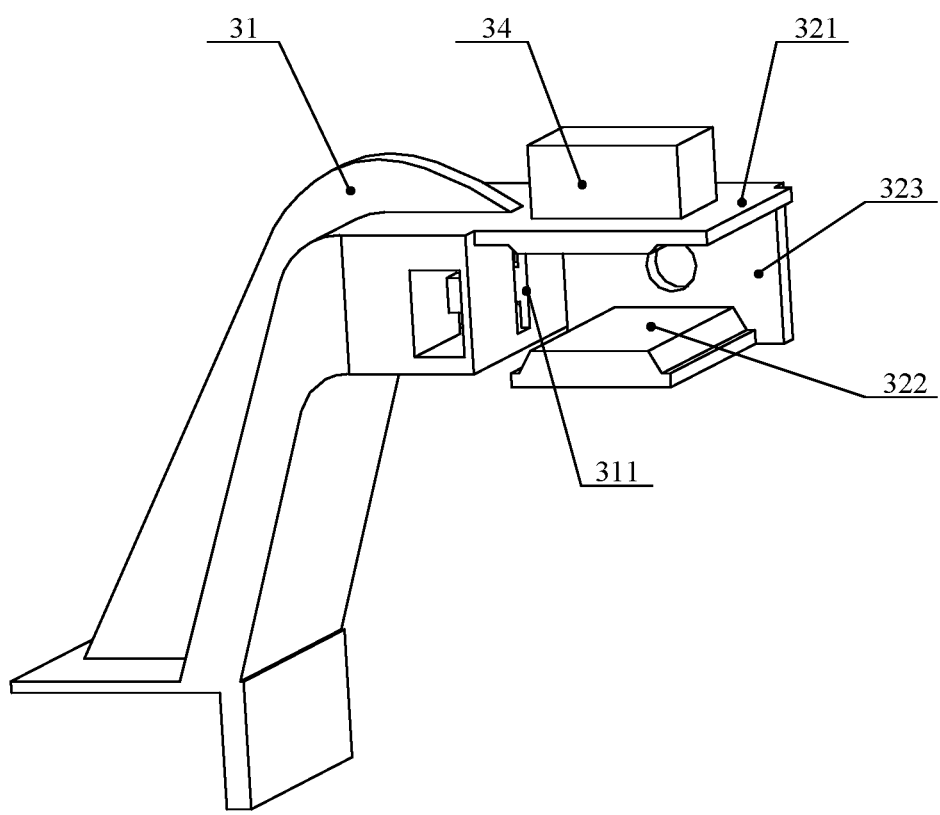
FIG. 8 illustrates a perspective view of a braking hanger in a bogie provided in embodiments of the present disclosure.
Figure 9:
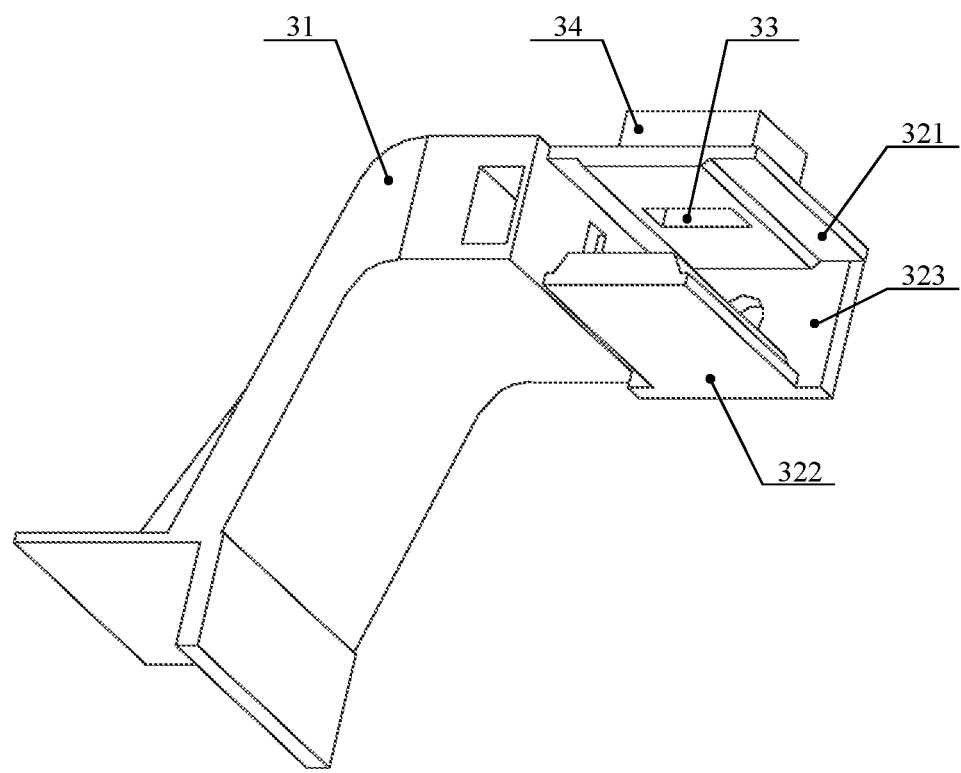
FIG. 9 illustrates another perspective view of a braking hanger in a bogie provided in embodiments of the present disclosure.

FIG. 8 illustrates a perspective view of a braking hanger in a bogie provided in embodiments of the present disclosure, and FIG. 9 illustrates another perspective view of a braking hanger in a bogie provided in embodiments of the present disclosure. As shown in FIG. 6 to FIG. 9, there is a certain gap between the guiding block 42 and the substrate plate 41, forming a receiving space 43.

The guiding frame 32 includes a top plate 321, a bottom plate 322 and a side plate 323 connected between the top plate 321 and the bottom plate 322. The top plate 321 is parallel to the bottom plate 322 and perpendicular to the side plate 323. The bottom plate 322 is inserted into the above-mentioned receiving space 43. In addition, the substrate plate 41 is provided with a fixing plate 44, which is parallel to the side plate 323. The fixing plate 44 is located at one side of the guiding block 42 and the side plate 323 is located at another side of the guiding block 42. The distance between the fixing plate 44 and the side plate 323 is greater than the length of the guiding block 42 in the transverse direction. The difference between the distance between the fixing plate 44 and the side plate 323 and the length of the guiding block 42 in the transverse direction is the distance with which the guiding block 42 is movable along the transverse direction.

In the process of assembling the guiding frame 32 and the hanger slider 4, the bottom plate 322 is inserted into the receiving space 43, and then the fixing plate 44 is fixedly connected to each of the top plate 321 and the bottom plate 322, so that the side plate 323 and the fixing plate 44 limit the guiding block 42 from coming out of the guiding frame 32.

With the above technical solutions, the bottom plate 322 of the braking hanger 3 applies an upward supporting force to the guiding block 42, so that the hanger slider 4 and the vehicle wheel braking clamp 5 are hung on the braking hanger 3, and are movable along the transverse direction with respect to the braking hanger 3.

In addition to the above technical solutions provided in this embodiment, it is possible to adopt other implementations as follows.

Figure 10:
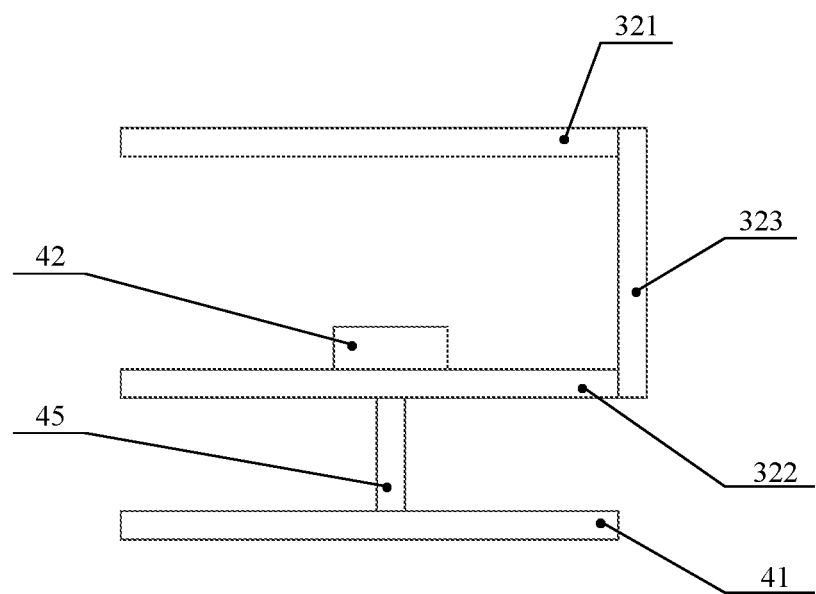
FIG. 10 illustrates a front view of another implementation of a braking hanger and a hanger slider in a bogie provided in embodiments of the present disclosure.
Figure 11:
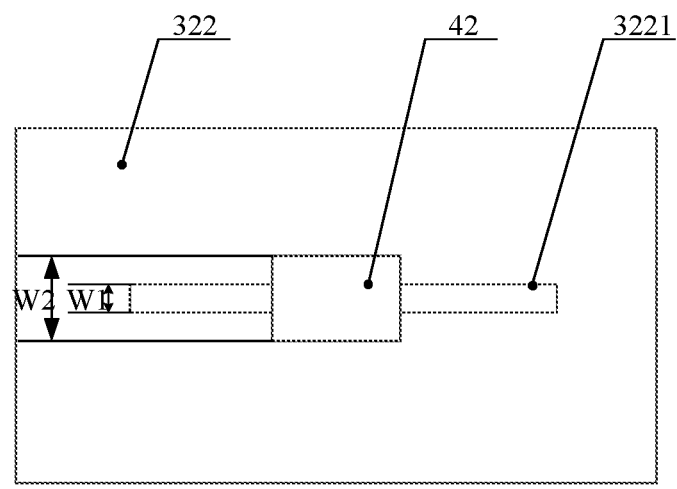
FIG. 11 is a top view of a bottom plate and a guiding block in a braking hanger in FIG. 10.

FIG. 10 illustrates a front view of another implementation of a braking hanger and a hanger slider in a bogie provided in embodiments of the present disclosure, and FIG. 11 is a top view of a bottom plate and a guiding block in a braking hanger in FIG. 10. As shown in FIG. 10 and FIG. 11, the guiding frame 32 includes a top plate 321, a bottom plate 322 and a side plate 323 connected between the top plate 321 and the bottom plate 322. The bottom plate 322 is provided with an elongated through hole 3221, and the width W1 of the through hole 3221 is smaller than the width W2 of the guiding block 42. The guiding block 42 is connected to the substrate plate 41 by a guiding rod 45, and the guiding block 42 is detachably connected to the guiding rod 45. The assembling process of the above-mentioned braking hanger 3 and the hanger slider 4 is that: the guiding rod 45 penetrates into the guiding frame 32 through the through hole 3221 from the outside, and then the guiding rod 45 is connected to the guiding block 42. The bottom plate 322 plays a role for supporting the guiding block 42, so that the hanger slider 4 and the vehicle wheel braking clamp 5 are hung on the braking hanger 3, and are movable along the transverse direction with respect to the braking hanger 3.

On the basis of the above technical solutions, the bogie may be further optimized.

Figure 12:
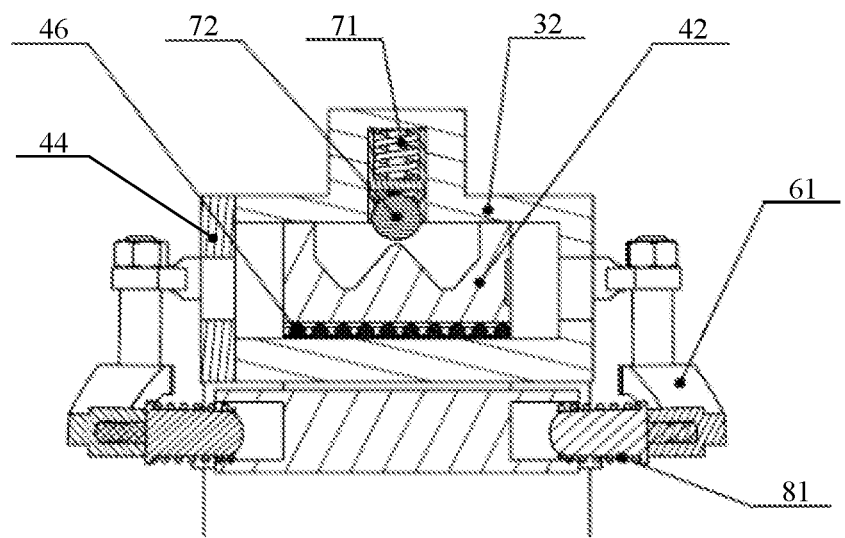
FIG. 12 illustrates a cross-sectional view of a section B-B in FIG. 5.
Figure 13:
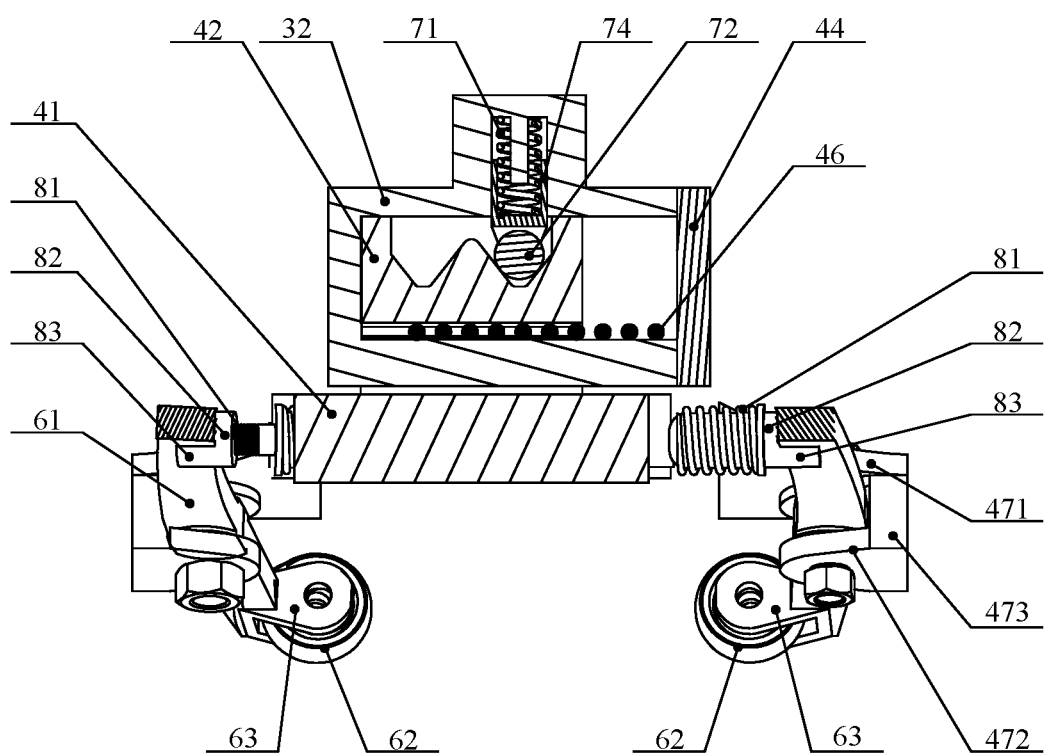
FIG. 13 illustrates a cross-sectional view of a section C-C in FIG. 5.
Figure 14:
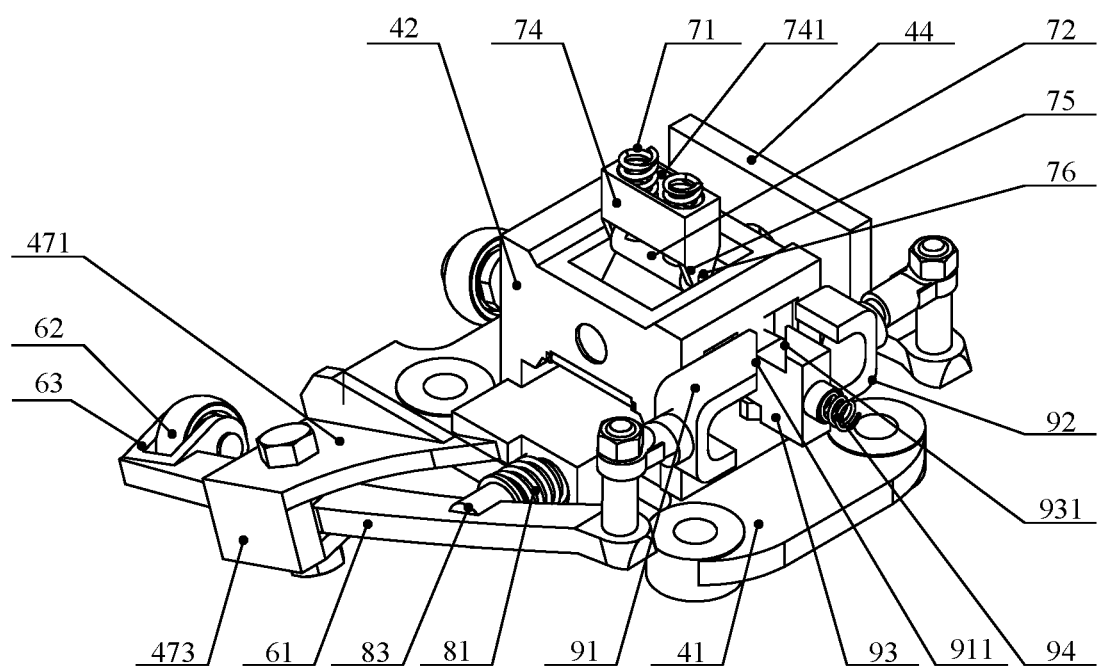
FIG. 14 illustrates a perspective view showing the cooperation between a hanger slider and an elastic guiding mechanism in a bogie provided in embodiments of the present disclosure.

FIG. 12 illustrates a cross-sectional view of a section B-B in FIG. 5, FIG. 13 illustrates a cross-sectional view of a section C-C in FIG. 5, and FIG. 14 illustrates a perspective view showing the cooperation between a hanger slider and an elastic guiding mechanism in a bogie provided in embodiments of the present disclosure. As shown in FIG. 12 to FIG. 14, an inner surface of the top plate 321 of the guiding frame 32 facing the bottom plate 322 is provided with an elastic guiding mechanism. A top surface of the guiding block 42 is recessed inwardly to form a wave-shaped guiding groove 421 with more than two wave troughs, and the elastic guiding mechanism is configured to abut against a surface of the wave-shaped guiding groove 421.

When the elastic guiding mechanism is close to the position of the wave trough of the wave-shaped guiding groove 421, the transverse movement of the guiding block 42 may be limited at a certain level. When the rail train vibrates during traveling, the guiding block 42 can move a little along the transverse direction. However, the existence of the elastic guiding mechanism may prevent the guiding block 42 from moving along the transverse direction, thereby ensuring that the hanger slider 4 is always in a position corresponding to the vehicle wheel 21, and achieving the effect of locking the hanger slider 4.

Specifically, the above-mentioned elastic guiding mechanism includes a first spring 71, a guiding wheel 72 and a first rotating shaft. One end of the first spring 71 is fixed to the inner surface of the top plate 321 of the braking hanger 3, and another end of the first spring 71 is connected to the first rotating shaft, and the first rotating shaft is inserted into an axial hole of the guiding wheel 72. The guiding wheel 72 may rotate about the first rotating shaft, so that the guiding wheel 72 and the surface of the wave-shaped guiding groove 421 are in rolling friction.

Alternatively, in another implementation, the elastic guiding mechanism includes a first spring 71, a guiding wheel 72, a first rotating shaft and a supporting block 74. A top surface of the supporting block 74 is recessed inwardly to form a supporting slot 741 for receiving the first spring 71, and an end of the first spring 71 is fixed to the inner surface of the top plate 321. The supporting block 74 is provided with a supporting lug 75 extending towards the guiding wheel 72, and the supporting lug 75 is provided with a supporting hole 76 through which an end of the first rotating shaft passes. The first rotating shaft is inserted into an axial hole of the guiding wheel 72.

Furthermore, the above-mentioned braking hanger 3 may be provided with a housing slot 33. The first spring 71 may be located in the housing slot 33, and one end of the first spring 71 away from the guiding wheel 72 may be fixed to the bottom surface of the housing slot 33. As shown in FIG. 8 and FIG. 9, a bump 34 may be provided on the top of the top plate 321, which is recessed inwardly towards the surface of the top plate 321 to form the above-mentioned housing slot 33. The top plate 321 is provided with a through hole which corresponds to the notch of the housing slot 33, so that the first spring 71 may protrude into the housing slot 33 through the through hole.

In the above two technical solutions, the guiding wheel 72 is provided to form a rolling friction with the wave-shaped guiding groove 421. However, in fact, the elastic guiding mechanism and the wave-shaped guiding groove 421 may be in sliding friction, that is, the guiding wheel 72 is not adopted, but a guiding body is connected to one end of the first spring 71 facing the wave-shaped guiding groove 421. The contact surface of the guiding body contacting with the wave-shaped guiding groove 421 is an arc surface.

In addition to the above three implementations, the elastic guiding mechanism may be implemented in other implementations, which is not specifically limited in this embodiment.

Figure 15:
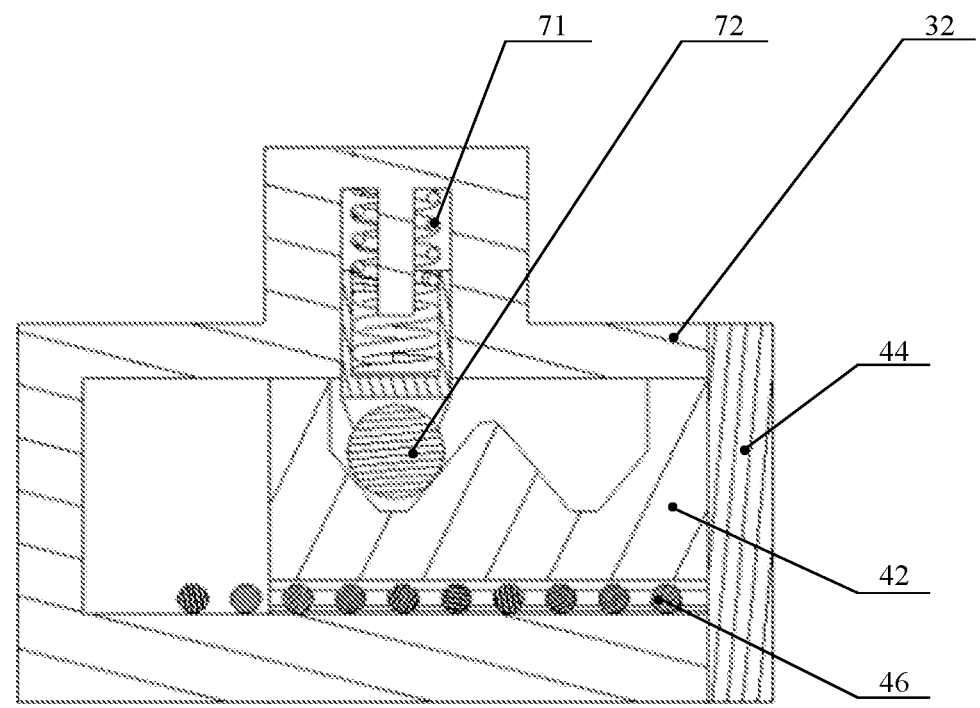
FIG. 15 illustrates a cross-sectional view showing a movement of a guiding block with respect to a guiding frame in a bogie provided in embodiments of the present disclosure.
Figure 16:
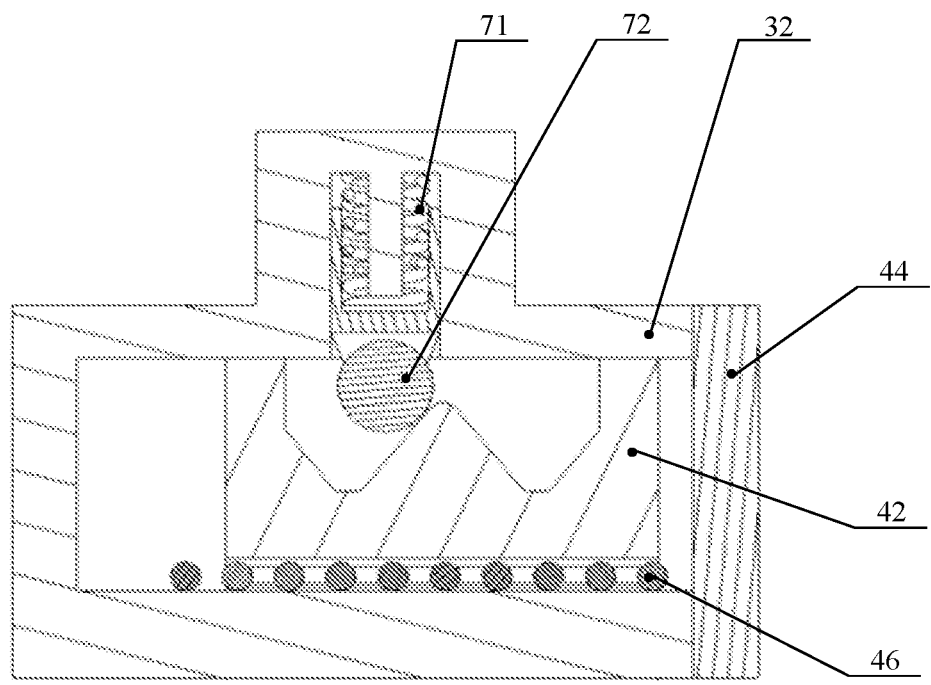
FIG. 16 illustrates another cross-sectional view showing a movement of a guiding block with respect to a guiding frame in a bogie provided in embodiments of the present disclosure.
Figure 17:
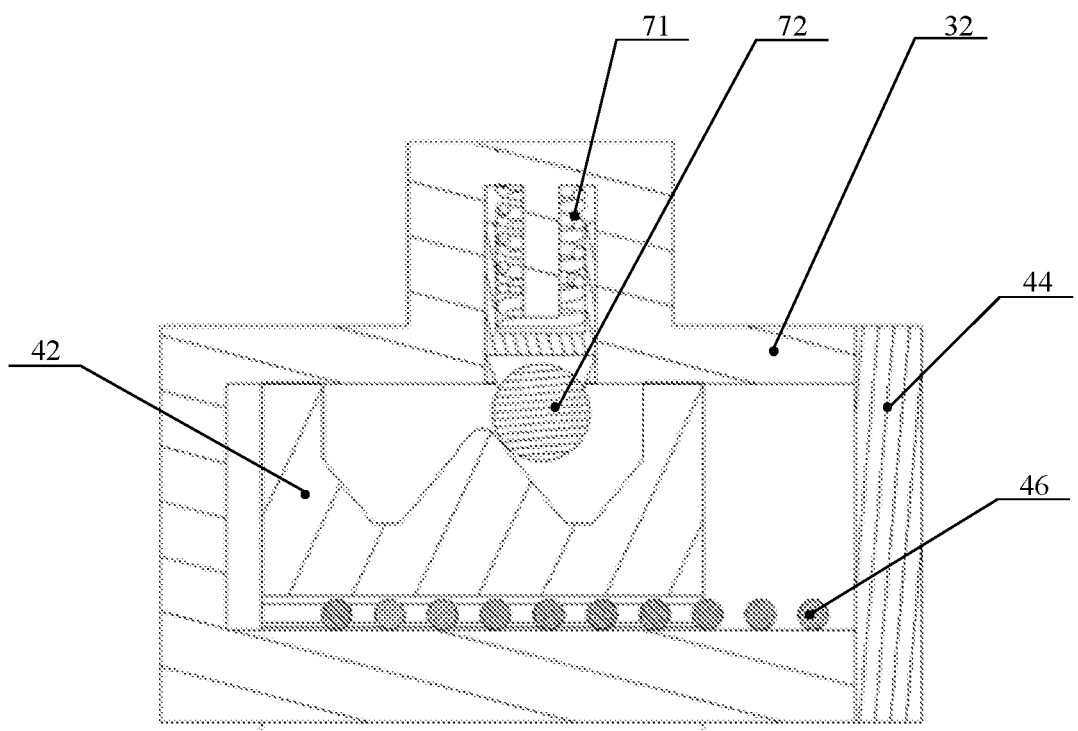
FIG. 17 illustrates a further cross-sectional view showing a movement of a guiding block with respect to a guiding frame in a bogie provided in embodiments of the present disclosure.
Figure 18:
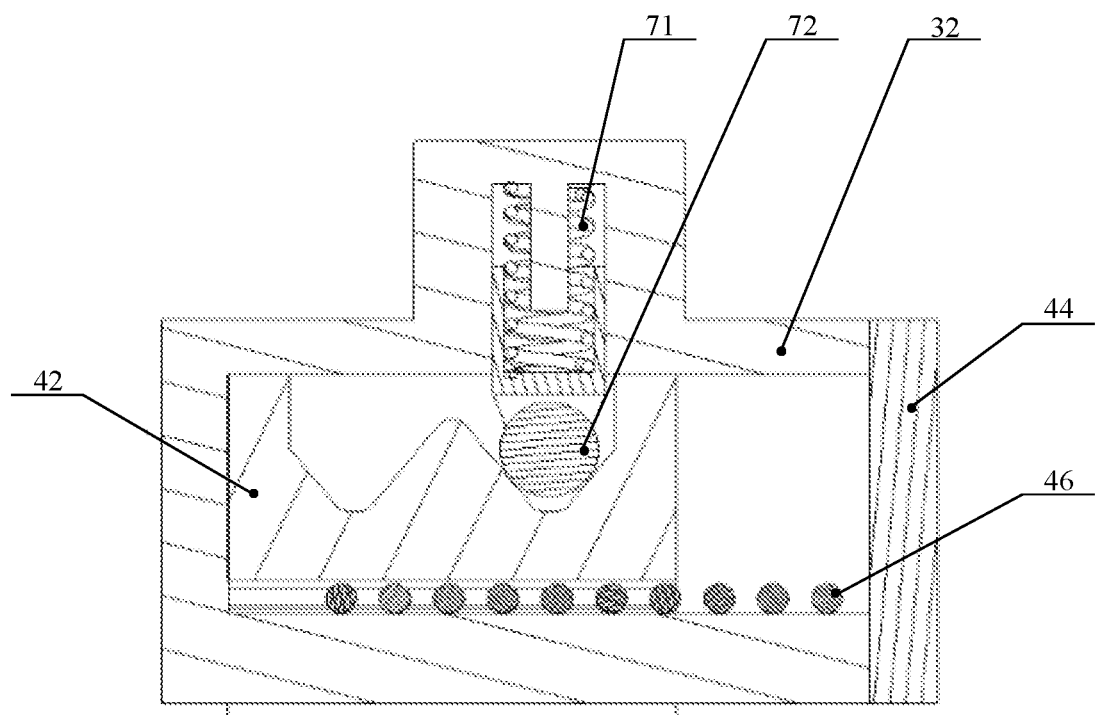
FIG. 18 illustrates a still further cross-sectional view showing a movement of a guiding block with respect to a guiding frame in a bogie provided in embodiments of the present disclosure.

FIG. 15 illustrates a cross-sectional view showing a movement of a guiding block with respect to a guiding frame in a bogie provided in embodiments of the present disclosure. FIG. 16 illustrates another cross-sectional view showing a movement of a guiding block with respect to a guiding frame in a bogie provided in embodiments of the present disclosure. FIG. 17 illustrates a further cross-sectional view showing a movement of a guiding block with respect to a guiding frame in a bogie provided in embodiments of the present disclosure. FIG. 18 illustrates a still further cross-sectional view showing a movement of a guiding block with respect to a guiding frame in a bogie provided in embodiments of the present disclosure. In FIG. 15 to FIG. 18, the wave-shaped guiding groove 421 has two wave troughs, and a wave crest is formed between the two wave troughs.

The operation process of adopting the above-mentioned elastic guiding mechanism is as follows.

As shown in FIG. 15, the vehicle wheel 21 operates in the first position. Correspondingly, the current position of the guiding block 42 is defined as an initial position, that is, the guiding block 42 is located at the rightmost end of the guiding frame 32. Under the elastic force of the first spring 71, the guiding wheel 72 is located in the wave trough on the left side of the wave-shaped guiding groove 421.

As shown in FIG. 16, the vehicle wheel 21 gradually moves from the first position to the target position, and drives the guiding block 42 to move in the same direction through the transmission member 6. Specifically, the guiding block 42 moves towards the left side in FIG. 16, the left side surface of the wave crest of the wave-shaped guiding groove 421 applies an upward thrust to the guiding wheel 72, urging the guiding wheel 72 to roll on said surface and to move upward to apply pressure to the first spring 71.

As shown in FIG. 17, the guiding block 42 continues to move to the left. After the guiding wheel 72 passes the wave crest of the wave-shaped guiding groove 421, it moves downward under the action of the elastic force of the first spring 71.

As shown in FIG. 18, the thrust applied on the hanger slider 4 by the vehicle wheel 21 disappears. Under the action of the elastic force of the first spring 71, the guiding wheel 72 moves downward, and pushes the guiding block 42 to continue to move to the left, until the guiding wheel 72 is located in the right wave trough of the wave-shaped guiding groove 421.

When the guiding wheel 72 is located in each of the two wave troughs of the wave-shaped guiding groove 421, the guiding block 42 may be locked at a certain level to avoid the transverse movement of the hanger slider 4 due to the vibration of the bogie.

In some optional implementations, rollers arranged along the transverse direction are provided between the above-mentioned guiding frame 32 and the guiding block 42, so that the guiding block 42 and the guiding frame 32 are in rolling friction. Specifically, more than two rollers 46 arranged along the transverse direction are provided between the substrate plate 322 and the guiding block 42. The rollers 46 may be directly placed on the surface of the bottom plate 322, or an arc groove, in which the rollers 46 are placed, may be provided on the surface of the bottom plate 322 facing the guiding block 42.

On the basis of the above technical solutions, the bogie may be further optimized, especially the transmission member 6 may be further optimized.

As shown in FIGS. 3, 4, 5, 6, 13 and 14, the above-mentioned transmission member 6 include a linkage 61, a first end of which serves as the first end of the transmission member 6, and a second end of which serves as a second end of the transmission member 6. The first end of the linkage 61 extends to the side surface of the vehicle wheel 21. In the process of normal operation of the vehicle wheel 21, a set distance is maintained between the first end of the linkage 61 and the vehicle wheel 21, and the first end of the linkage does not contact with the vehicle wheel 21 and thus does not affect the rotation of the vehicle wheel 21.

The second end of the linkage 61 may be directly connected (for example, fixedly connected) to the guiding block 42, so that when the vehicle wheel 21 moves along the transverse direction to contact with the first end of the linkage 61 and applies a thrust to the first end of the linkage 61, the second end of the linkage 61 directly drives the guiding block 42 to move in the same direction.

Alternatively, implementations shown in FIGS. 3, 4, 5, 6, 13 and 14 may also be adopted as follows. The substrate plate 41 is provided with a hinge part. The hinge part is hinged with a middle part of the linkage 61, so that the linkage 61 may rotate about the hinge point. Furthermore, when the vehicle wheel 21 moves along the transverse direction to contact with the first end of the linkage 61 and applies a thrust to the first end of the linkage 61, the middle part of the linkage 61 may drive the guiding block 42 to move in the same direction.

Furthermore, the above-mentioned hinge part specifically includes an upper hinge plate 471, a lower hinge plate 472 and a stopping plate 473 connected between the upper hinge plate 471 and the lower hinge plate 472. Each of the upper hinge plate 471 and the lower hinge plate 472 is provided with a hinge hole 474, which is configured to be connected with a through hole provided in the middle part of the linkage 61 through a hinge member. The hinge member may be a hinge shaft. For example, both ends of the hinge shaft are provided with external threads. After the hinge shaft is inserted into the hinge hole of the upper hinge plate 471, the through hole in the middle part of the linkage 61 and the hinge hole 474 of the lower hinge plate 472, one nut of two nuts is threaded onto the external threads at one end of the hinge shaft and another nut of two nuts is threaded onto the external threads at another end of the hinge shaft from the outside, so that the linkage 61 may rotate about the hinge shaft.

In addition, when the linkage 61 is pushed by the vehicle wheel 21 to rotate to contact with the stopping plate 473, the stopping plate 473 limits the continuous rotation of the linkage 61, and the force applied by the linkage 61 to the stopping plate 473 may drive the substrate plate 41 and the guiding block 42 to move in the same direction as that of the vehicle wheel 21.

Furthermore, the above-mentioned transmission member 6 may further include a transverse displacing wheel 62, which is arranged at the first end of the linkage 61. A tread of the transverse displacing wheel 62 is configured for contacting with a rim of the vehicle wheel 21. Specifically, two connecting lugs 63 are provided at the first end of the linkage 61, and each of the two connecting lugs 63 is provided with a through hole. A rotating shaft passes through the through holes of the connecting lugs 63 and the transverse displacing wheel 62, so that the transverse displacing wheel 62 is fixed to the first end of the linkage 61, and the transverse displacing wheel 62 may rotate.

If the distance between the vehicle wheels 21 is adjusted when the rail train stops, since the vehicle wheel 21 and the linkage 61 are stationary relative to each other after they are in contact with each other, the transverse displacing wheel 62 may not be adopted. However, if the distance between the vehicle wheels 21 is adjusted in the traveling process of the rail train, since there is relative movement between the vehicle wheel 21 and the linkage 61 after they are in contact with each other due to the rotation of the vehicle wheel 21, the transverse displacing wheel 62 is adopted to be rolled on the side surface of the vehicle wheel 21, to avoid wear caused by long-term friction between only one surface of the end of the linkage 61 and the vehicle wheel 21.

Furthermore, the substrate plate 41 may also be provided with an adjusting mechanism. The adjusting mechanism is arranged between the substrate plate 41 and the transmission member 6, and configured for adjusting the transverse displacement of the transmission member 6, to maintain a preset distance between the first end of the transmission member 6 and the vehicle wheel 21, which in turn ensures that the vehicle wheel 21 does not contact with the transmission member 6 during its normal operation.

As shown in FIGS. 7, 13 and 14, the adjusting mechanism may specifically include an adjusting spring 81 and an adjusting block 82. The substrate plate 41 is provided with an adjusting hole 48, a center line of which is parallel to the transverse direction. The adjusting spring 81 is received in the adjusting hole 48. One end of the adjusting spring 81 is fixedly connected to the adjusting block 82, and the adjusting block 82 abuts against a side of the transmission member 6 facing the guiding block 42. The length and elastic coefficient of the adjusting spring 81 are set according to the distance between the linkage 61 and the substrate plate 41, so that the adjusting spring 81 is pressed between the substrate plate 41 and the adjusting block 82, and abuts between the middle part and the second end of the linkage 61.

In some optional implementations, a claw 83 is provided at the end of the adjusting block 82 facing the linkage 61, which may be clamped on the linkage 61 to avoid the linkage 61 from moving along a longitudinal direction and separating from the adjusting block 82. The longitudinal direction refers to a direction perpendicular to the transverse direction, that is, the vertical direction shown in FIG. 13. The structure of the claw 83 may be realized in many ways. In this embodiment, the claws 83 are two stoppers protruding from the end of the adjusting block 82. The linkage 61 may be received between the two stoppers, and the two stoppers limit the movement of the linkage 61 along the longitudinal direction.

In FIG. 13, the left linkage 61 is subjected to a leftward pressure applied by the vehicle wheel 21, urging the first end of the linkage 61 to move to the left and the second end of the linkage 61 to move to the right (it can be seen from the top view of FIG. 13, the linkage 61 rotates clockwise). The second end of the linkage 61 moves to the right, applying a rightward pressure to the adjusting spring 81 to compress the adjusting spring.

The number of the above-mentioned linkage 61 is two, and the two linkages are symmetrically distributed on both sides of the guiding block 42. The arrangement of the guiding block 42 and the linkage 61 is similar to that of the linkage and the guiding block.

On the basis of the above technical solutions, the bogie may be further optimized.

The bogie may also be provided with a locking mechanism. The locking mechanism is configured for locking the guiding block 42 in a preset position, to further prevent the hanger slider 4 and the vehicle wheel braking clamp 5 from moving transversely due to the vibration of the bogie. The preset position is a position of the bogie before the gauge is changed or a position of the bogie after the gauge is changed.

Specifically, as shown in FIG. 14, the locking mechanism includes a first locking member 91, a second locking member 92, a locking block 93 and a second spring 94. The first locking member 91 is provided with a first guiding ramp 911, and the locking block 93 is provided with a second guiding ramp 931 cooperating with the first guiding ramp 911. As shown in FIG. 7 and FIG. 14, a sidewall of the guiding block 42 parallel to the transverse direction is provided with more than two locking slots 422 sequentially arranged along the transverse direction. One end of the second spring 94 is connected to the base 31, and another end of the second spring 94 is connected to the locking block 93, to push the locking block 93 to be inserted into the locking slot 422 to lock the guiding block 42. The first locking member 91 is connected to the second end of the linkage 61, to cooperate with the second locking member 92 under the driving of the linkage 61 to push the locking block 93 out of the locking slot 422 to unlock the guiding block 42.

In this embodiment, the number of the locking slots 422 is two. The locking block 93 may be inserted into each of the two locking slots 422, and may lock the guiding block 42 in a preset position. The two locking slots 422 are designated as a first locking slot 4221 and a second locking slot 4222, respectively.

Figure 19:
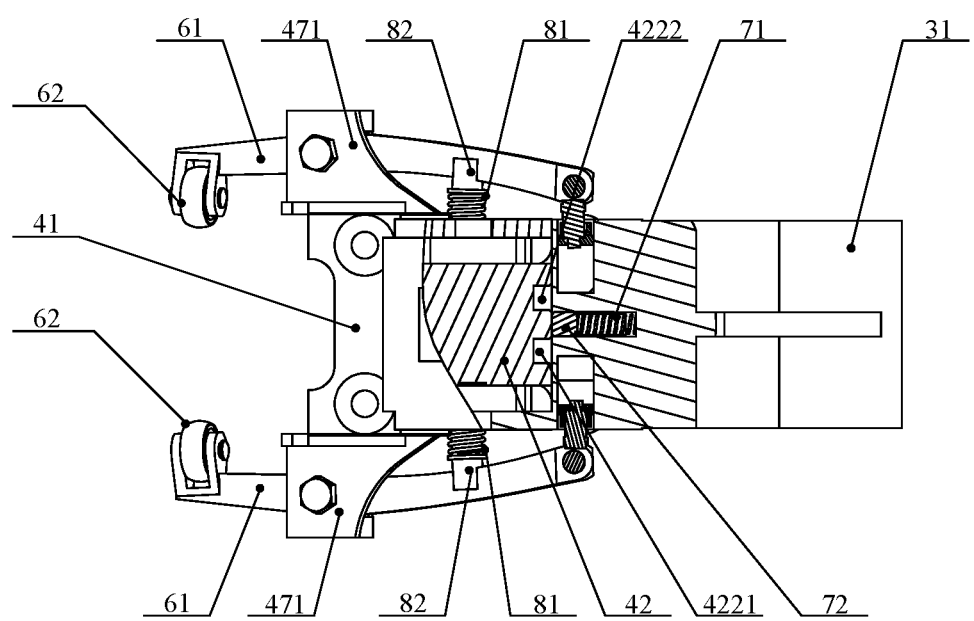
FIG. 19 illustrates a partial cross-sectional top view of a braking hanger and a hanger slider in a bogie provided in embodiments of the present disclosure.

FIG. 19 illustrates a partial cross-sectional top view of a braking hanger and a hanger slider in a bogie provided in embodiments of the present disclosure. As shown in FIG. 8 and FIG. 19, specifically, the base 31 is provided with a receiving slot 311 which may receive the second spring 94. One end of the second spring 94 may be fixed to the bottom surface of the receiving slot 311, and another end of the second spring 94 is connected to the locking block 93.

The first locking member 91 and the second locking member 92 may be a structure shown in FIG. 14, which are arranged along the transverse direction. The first locking member 91 and the second locking member 92 move toward each other and press the locking block 93, to move the locking block 93 in a direction away from the guiding block 42. After that, the first locking member 91 and the second locking member 92 may form an approximately rectangular frame shape. Alternatively, the first locking member 91 and the second locking member 92 may also adopt other structures, such as a block-shaped structure or a rod-shaped structure.

Each of the first locking member 91 and the second locking member 92 is connected to the linkage 61 on the corresponding side, for example in a hinged manner. The connection direction of the first locking member 91 and the linkage 61 is the same as that of the second locking member 92 and the linkage 61. Taking the first locking member 91 as an example, specifically, the second end of the linkage 61 is provided with a first fixing hole, and the end of the first locking member 91 is provided with a second fixing hole. The center lines of the first fixing hole and the second fixing hole coincide with each other. By passing the bolt through the first fixing hole and the second hole in sequence, and then threading the bolt with the nut, the first locking member 91 is connected to the linkage 61.

The operation process of the above-mentioned locking mechanism is as follows.

Firstly, the vehicle wheel 21 moves in the direction S.

Figure 20:
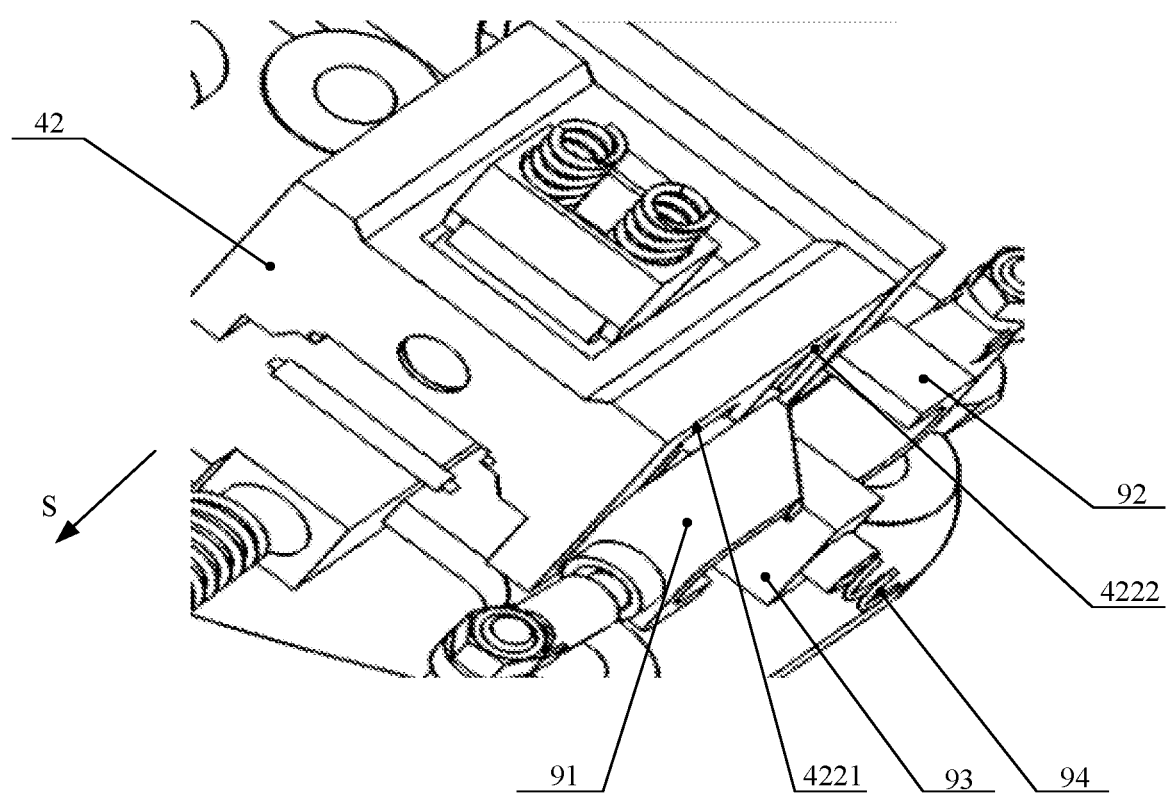
FIG. 20 illustrates a schematic diagram showing the cooperation between a locking mechanism and a guiding block in a bogie provided in embodiments of the present disclosure.

FIG. 20 illustrates a schematic diagram showing the cooperation between a locking mechanism and a guiding block in a bogie provided in embodiments of the present disclosure. As shown in FIG. 20, under the action of the elastic force of the second spring 94, the locking block 93 is inserted into the first locking slot 4221, and the second guiding ramp 931 is in contact with the first guiding ramp 911. The locking block 93 limits the movement of the guiding block 42 along the transverse direction, to achieve the effect of locking the guiding block 42.

Figure 21:
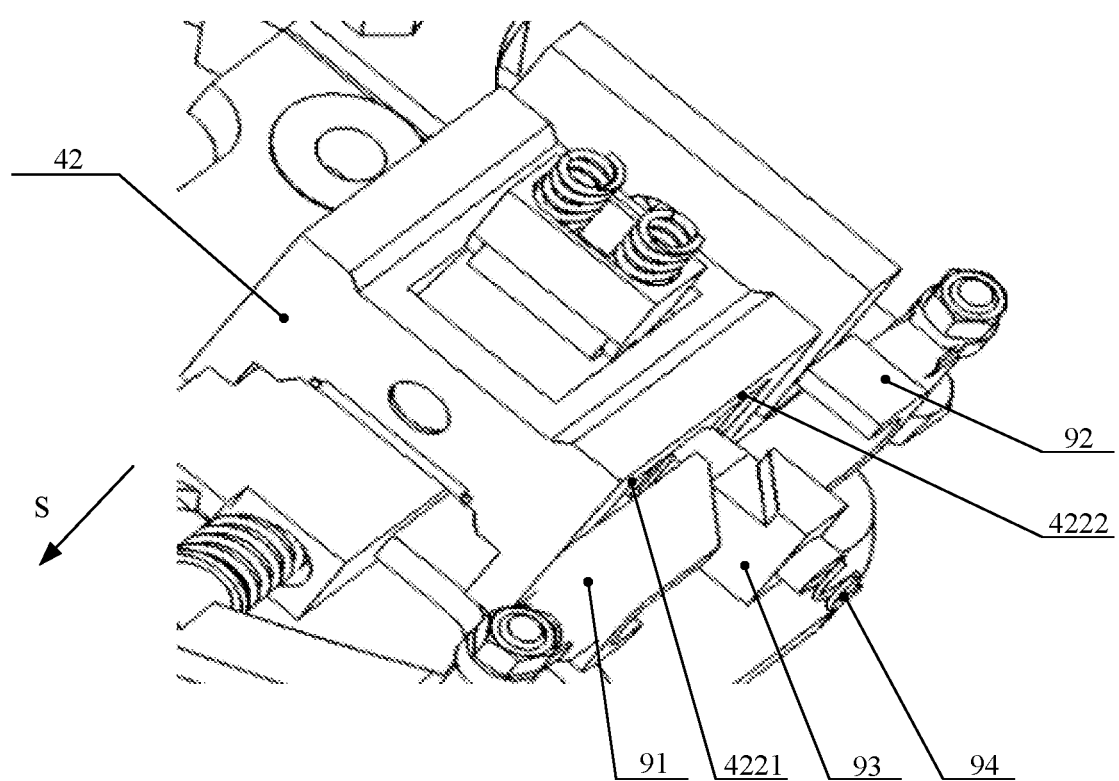
FIG. 21 illustrates another schematic diagram showing the cooperation between a locking mechanism and a guiding block in a bogie provided in embodiments of the present disclosure.

FIG. 21 illustrates another schematic diagram showing the cooperation between a locking mechanism and a guiding block in a bogie provided in embodiments of the present disclosure. As shown in FIG. 21, when the vehicle wheel 21 moves along the direction S, the first end of the linkage 61 is pushed to move in the same direction, and the second end of the linkage 61 applies a thrust to the first locking member 91 to move it in the direction closer to the second locking member 92 (i.e. the direction opposite to the direction S). After the first locking member 91 moves to cause the first guiding ramp 911 to be in contact with the second guiding ramp 931 of the locking block 93, the thrust applied by the first locking member 91 to the locking block 93 is perpendicular to the second guiding ramp 931. The component of the thrust perpendicular to the transverse direction may urge the locking member 93 to move along the direction perpendicular to the transverse direction, so that the locking member 93 comes out of the first locking slot 4221. When the guiding block 42 moves along the direction S under the driving of the linkage 61, under the action of the elastic force of the second spring 94, the locking block 93 abuts against the sidewall of the guiding block 42 between the first locking slot 4221 and the second locking slot 4222 after the locking block 93 is separated from the first locking member 91.

Figure 22:
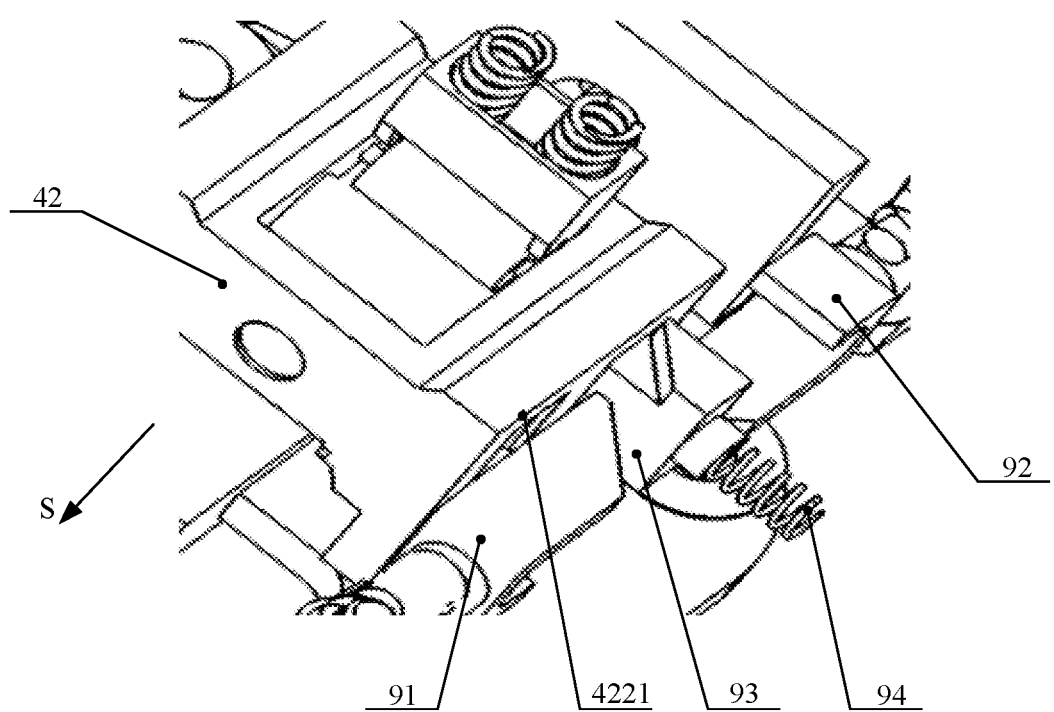
FIG. 22 illustrates a further schematic diagram showing the cooperation between a locking mechanism and a guiding block in a bogie provided in embodiments of the present disclosure.

FIG. 22 illustrates a further schematic diagram showing the cooperation between a locking mechanism and a guiding block in a bogie provided in embodiments of the present disclosure. As shown in FIG. 22, the guiding block 42 continues to move along the direction S. When the guiding block 42 moves to the position where the second locking slot 4222 and the locking block 93 are aligned, under the action of the elastic force of the second spring 94, the locking block 93 is inserted into the second locking slot 4222, to lock the guiding block 42.

In addition, at the end of this step, under the action of the elastic force of the adjusting spring 81, the linkage 61 rotates in the original direction until a preset distance is maintained between the first end of the linkage 61 and the vehicle wheel 21.

Secondly, the vehicle wheel 21 moves along a direction opposite to the direction S.

The difference from the above process is in that: the first locking member 91 is different, and the second locking member 92 moves in the direction S under the thrust of the linkage 61. When the second locking member 92 moves into contact with the locking block 93 and applies a pressure to the locking block 93, the locking block 93 is urged to escape from the locking slot by the interaction between the first guiding ramp 911 and the second guiding ramp 931.

The above technical solutions may be applied to a bogie of which the track is changed manually, and also to a bogie of which the track is changed automatically. Manual track changing means changing the track when the rail train stops, and automatic track changing means changing the track in the traveling process of the rail train.

This embodiment also provides a rail vehicle, which includes a bogie provided in the above embodiments. The bogie may be a power bogie or a non-power bogie.

The rail vehicle provided in this embodiment adopts the above-mentioned bogie. By fixing the braking hanger on the framework of the bogie and fixedly connecting the hanger slider and the vehicle wheel braking clamp, the hander slider is connected to the braking hanger and is movable along the transverse direction with respect to the braking hanger. Furthermore, the transmission member is connected to the hanger slider, the first end of the transmission member extends to the side surface of the vehicle wheel. When the vehicle wheel moves along the transverse direction, the transmission member drives the hanger slider and the vehicle wheel braking clamp to move along the transverse direction by a thrust applied by the vehicle wheel, so that the vehicle wheel braking clamp moves automatically to a position corresponding to the vehicle wheel with the movement of the vehicle wheel. This ensures that the rail train is braked by cooperating with the vehicle wheel in the braking state, without the need to manually adjust the position of the vehicle wheel braking clamp. This not only reduces the work intensity of the operators, but also improves the efficiency of the gauge changing process of the rail train.

In the description of the present disclosure, it is to be understood that orientation or position relationships indicated by terms "center", "longitudinal", "transverse", "length", "width", "thickness", "upper", "lower", "front", "back", "left", "right", "vertical", "horizontal", "top", "bottom", "inner", "outer" and the like are orientation or position relationships shown in the drawings, are adopted not to indicate or imply that indicated devices or components must be in specific orientations and structured and operated in specific orientations but only to conveniently describe the present disclosure and simplify the description, and are not to be construed as limiting the present disclosure.

In addition, terms "first" and "second" are only adopted for description and should not be understood to indicate or imply relative importance or to implicitly indicate the number of indicated technical features. Therefore, a feature defined by "first" and "second" may explicitly or implicitly indicate inclusion of one or more such features. In the description of the present disclosure, "multiple" means at least two, for example, two and three, unless otherwise limited definitely and specifically.

In the present disclosure, unless otherwise definitely specified and limited, terms "mount", "mutually connect", "connect", "fix" and the like should be broadly understood. For example, the terms may refer to fixed connection and may also refer to detachable connection or integrated connection. The terms may refer to mechanical connection, electrical connection or mutual communication. The terms may refer to direct mutual connection, may also refer to indirect connection through a medium and may refer to communication in two components or an interaction relationship of the two components, unless otherwise definitely limited. For those of ordinary skill in the art, specific meanings of these terms in the present disclosure can be understood according to a specific condition.

It is apparent that those skilled in the art may make various modifications and changes to the present disclosure without departing from departing from its spirit and scope. If these modifications and variations of the present disclosure belong to the scope of the claims of the present disclosure and its equivalent technology, the present disclosure is intended to include these modifications and variations.

The invention claimed is:

1. A bogie, comprising: a framework, a wheel pair connected to the framework, a braking hanger fixed to the framework, a hanger slider configured to be fixedly connected to a vehicle wheel braking clamp, and a transmission member, wherein:
the hanger slider is connected to the braking hanger, the transmission member is connected to the hanger slider, a first end of the transmission member extends to a side surface of a vehicle wheel in the wheel pair, and the transmission member is configured to drive the hanger slider to move along a transverse direction with respect to the braking hanger when the first end is subjected to a thrust applied in the transverse direction by the vehicle wheel, so that the vehicle wheel braking clamp moves to a position corresponding to the vehicle wheel, the hanger slider comprises: a substrate plate connected to the vehicle wheel braking clamp, and a first guiding structure arranged on the substrate plate, the braking hanger comprises: a base connected to the framework, and a second guiding structure arranged on the base, the first guiding structure is connected to the second guiding structure, and movable along the transverse direction with respect to the second guiding structure, the first guiding structure is a guiding block, and the second guiding structure is a guiding frame for receiving the guiding block, a receiving space is provided between the guiding block and the substrate plate, the guiding frame comprises a top plate, a bottom plate inserted into the receiving space, and a side plate connected between the top plate and the bottom plate, an inner surface of the top plate of the guiding frame facing the bottom plate is provided with an elastic guiding mechanism, and a top surface of the guiding block is recessed inwardly to form a wave-shaped guiding groove with more than two wave troughs, and the elastic guiding mechanism is configured to abut against a surface of the wave-shaped guiding groove.

2. The bogie of claim 1, wherein the elastic guiding mechanism comprises a first spring, a guiding wheel and a first rotating shaft, one end of the first spring is fixed to the inner surface of the top plate, and another end of the first spring is connected to the first rotating shaft, and the first rotating shaft is inserted into an axial hole of the guiding wheel.

3. The bogie of claim 1, wherein the elastic guiding mechanism comprises a first spring, a guiding wheel, a first rotating shaft and a supporting block, a top surface of the supporting block is recessed inwardly to form a supporting slot for receiving the first spring, one end of the first spring is fixed to the inner surface of the top plate, the supporting block is provided with a supporting lug extending towards the guiding wheel, the supporting lug is provided with a supporting hole through which an end of the first rotating shaft passes, and the first rotating shaft is inserted into an axial hole of the guiding wheel.

4. The bogie of claim 1, wherein more than two rollers arranged along the transverse direction are provided between the bottom plate and the guiding block.

5. The bogie of claim 1, wherein the transmission member comprises a linkage, a first end of which serves as the first end of the transmission member, and a second end of which serves as a second end of the transmission member.

6. The bogie of claim 5, wherein the substrate plate is provided with a hinge part, with which a middle part of the linkage is hinged.

7. The bogie of claim 6, wherein the hinge part comprises an upper hinge plate, a lower hinge plate and a stopping plate connected between the upper hinge plate and the lower hinge plate, each of the upper hinge plate and the lower hinge plate is provided with a hinge hole, which is configured to be connected with a through hole provided in the middle part of the linkage through a hinge member.

8. The bogie of claim 7, wherein the bogie further comprises a locking mechanism, which is configured for locking the guiding block in a preset position.

9. The bogie of claim 8, wherein the locking mechanism comprises a first locking member, a second locking member, a locking block and a second spring, the first locking member is provided with a first guiding ramp, and the locking block is provided with a second guiding ramp cooperating with the first guiding ramp, a sidewall of the guiding block parallel to the transverse direction is provided with more than two locking slots sequentially arranged along the transverse direction, one end of the second spring is connected to the base, and another end of the second spring is connected to the locking block, to push the locking block to be inserted into the locking slot to lock the guiding block, the first locking member is connected to the second end of the linkage, to cooperate with the second locking member under the driving of the linkage to push the locking block out of the locking slot to unlock the guiding block.

10. The bogie of claim 5, wherein the transmission member further comprises a transverse displacing wheel, which is connected to the first end of the linkage, and a tread of which is configured for contacting with a rim of the vehicle wheel.

11. A bogie, comprising: a framework, a wheel pair connected to the framework, a braking hanger fixed to the framework, a hanger slider configured to be fixedly connected to a vehicle wheel braking clamp, and a transmission member, wherein:
the hanger slider is connected to the braking hanger, the transmission member is connected to the hanger slider, a first end of the transmission member extends to a side surface of a vehicle wheel in the wheel pair, and the transmission member is configured to drive the hanger slider to move along a transverse direction with respect to the braking hanger when the first end is subjected to a thrust applied in the transverse direction by the vehicle wheel, so that the vehicle wheel braking clamp moves to a position corresponding to the vehicle wheel, the hanger slider comprises: a substrate plate connected to the vehicle wheel braking clamp, and a first guiding structure arranged on the substrate plate, the braking hanger comprises: a base connected to the framework, and a second guiding structure arranged on the base, the first guiding structure is connected to the second guiding structure, and movable along the transverse direction with respect to the second guiding structure, and wherein the substrate plate is provided with an adjusting mechanism arranged between the substrate plate and the transmission member, which is configured for adjusting transverse displacement of the transmission member to maintain a preset distance between the first end of the transmission member and the vehicle wheel.

12. The bogie of claim 11, wherein the adjusting mechanism comprises an adjusting spring and an adjusting block, the substrate plate is provided with an adjusting hole, a center line of which is parallel to the transverse direction, and within which the adjusting spring is received, one end of the adjusting spring is fixedly connected to the adjusting block, and the adjusting block abuts against a side of the transmission member facing the guiding block.

13. A rail vehicle, comprising a bogie, the bogie comprising: a framework, a wheel pair connected to the framework, a braking hanger fixed to the framework, a hanger slider configured to be fixedly connected to a vehicle wheel braking clamp, and a transmission member, wherein:

the hanger slider is connected to the braking hanger, the transmission member is connected to the hanger slider, a first end of the transmission member extends to a side surface of a vehicle wheel in the wheel pair, and the transmission member is configured to drive the hanger slider to move along a transverse direction with respect to the braking hanger when the first end is subjected to a thrust applied in the transverse direction by the vehicle wheel, so that the vehicle wheel braking clamp moves to a position corresponding to the vehicle wheel, the hanger slider comprises: a substrate plate connected to the vehicle wheel braking clamp, and a first guiding structure arranged on the substrate plate, the braking hanger comprises: a base connected to the framework, and a second guiding structure arranged on the base, the first guiding structure is connected to the second guiding structure, and movable along the transverse direction with respect to the second guiding structure, the first guiding structure is a guiding block, and the second guiding structure is a guiding frame for receiving the guiding block, a receiving space is provided between the guiding block and the substrate plate, the guiding frame comprises a top plate, a bottom plate inserted into the receiving space, and a side plate connected between the top plate and the bottom plate, an inner surface of the top plate of the guiding frame facing the bottom plate is provided with an elastic guiding mechanism, a top surface of the guiding block is recessed inwardly to form a wave-shaped guiding groove with more than two wave troughs, and the elastic guiding mechanism is configured to abut against a surface of the wave-shaped guiding groove.

* * * * *